United States Patent
Cressy

(10) Patent No.: US 10,112,755 B1
(45) Date of Patent: Oct. 30, 2018

(54) REUSABLE CABLE TIES

(71) Applicant: Claude Cressy, Colorado Springs, CO (US)

(72) Inventor: Claude Cressy, Colorado Springs, CO (US)

( * ) Notice: Subject to any disclaimer, the term of this patent is extended or adjusted under 35 U.S.C. 154(b) by 53 days.

(21) Appl. No.: 15/658,553

(22) Filed: Jul. 25, 2017

(51) Int. Cl.
*B65D 63/10* (2006.01)

(52) U.S. Cl.
CPC .... *B65D 63/1027* (2013.01); *B65D 2563/103* (2013.01); *B65D 2563/107* (2013.01)

(58) Field of Classification Search
CPC .......... B65D 63/1027; B65D 2563/103; B65D 2563/107
See application file for complete search history.

(56) References Cited

U.S. PATENT DOCUMENTS

| | | | |
|---|---|---|---|
| RE14,762 E | 11/1919 | Springer | |
| 2,936,980 A * | 5/1960 | Rapata | F16L 3/12 24/16 PB |
| 3,263,292 A | 8/1966 | Joseph | |
| 3,475,793 A * | 11/1969 | Oetiker | F16L 33/025 24/20 CW |
| 4,183,121 A | 1/1980 | Cousins | |
| 4,492,004 A * | 1/1985 | Oetiker | F16B 2/08 24/20 R |
| 4,711,001 A | 12/1987 | Oetiker | |
| RE33,934 E * | 5/1992 | Oetiker | F16L 33/025 24/19 |
| 5,305,499 A * | 4/1994 | Oetiker | F16L 33/025 24/20 R |
| 6,185,791 B1 | 2/2001 | Khokhar | |
| 6,247,206 B1 * | 6/2001 | Craig, Jr. | F16L 33/025 24/20 CW |
| 6,477,746 B1 | 11/2002 | Axelsson | |
| 8,739,387 B1 | 6/2014 | Frishberg | |
| D729,054 S | 5/2015 | Chen | |
| 2005/0177232 A1 * | 8/2005 | Ashton | A61B 17/12013 623/6.63 |
| 2005/0251897 A1 * | 11/2005 | LeBlanc | A41F 9/002 2/326 |
| 2016/0325897 A1 | 11/2016 | Kierstead | |

FOREIGN PATENT DOCUMENTS

WO 2015089630 6/2015

* cited by examiner

*Primary Examiner* — David M Upchurch

(57) ABSTRACT

The reusable cable tie is a self-attaching strapping apparatus. The reusable cable tie is used to truss filamentary materials together. When in use, the reusable cable tie form a loop through which the filamentary materials are inserted before the reusable cable tie is tightened to form the truss. The reusable cable attaches to itself to form a loop. The diameter of the loop is adjustable. The filamentary materials are inserted through the loop. The truss is then formed by adjusting the reusable cable tie to reduce the diameter of the loop such that the reusable cable tie applies a force against the filamentary materials. At this point, the truss is formed. The reusable cable tie a base structure, a plurality of slots, and a plurality of pegs. The plurality of slots are formed within the base structure. The plurality of pegs are attached to the base structure.

5 Claims, 4 Drawing Sheets

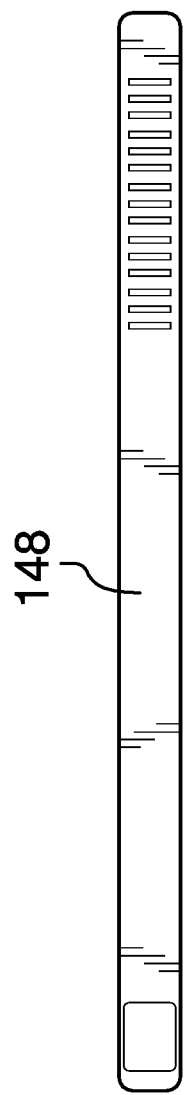
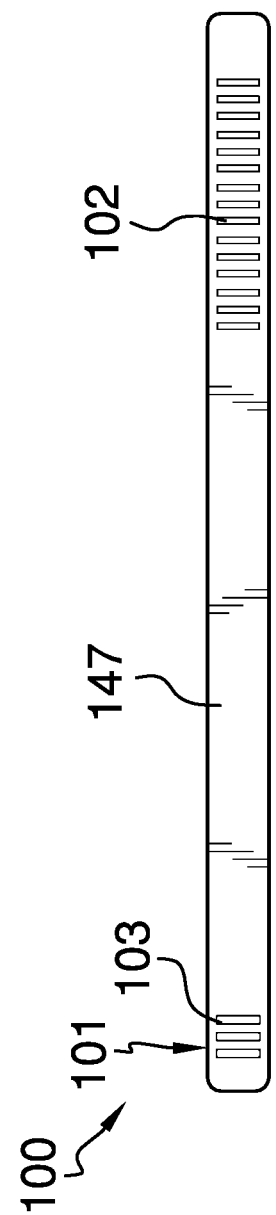

REUSABLE CABLE TIES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting including packing and storing, more specifically, a flexible elongated strap configured for use in bundling cables or other filamentary items of varied widths and lengths.

The cable tie is a well-known and commonly available fastening mechanism that is commonly used to bundle materials for organizational and storage purposes. One drawback of the cable tie is that the traditional cable tie is a disposable product. This disposability comes from the fact that a cable tie must be destroyed (cut) to free the bundled materials. While this is good for the temporary storage of materials and the storage of materials in not readily visible locations, the use of a cable tie can be problematic for situations where: 1) the materials to be bundled by the cable tie change regularly over time; and, 2) in situations where the materials to be bundled are stored in a highly visible area wherein neatness is desired. In these situations, a reusable version in varied lengths and widths of a cable tie would be of benefit.

SUMMARY OF INVENTION

The reusable cable tie is a self-attaching strapping apparatus. The reusable cable tie is used to truss filamentary materials together. When in use, the reusable cable tie forms a loop through which the filamentary materials are inserted before the reusable cable tie is tightened to form the truss. The reusable cable attaches to itself to form the loop. The diameter of the loop is adjustable. The filamentary materials are inserted or held and wrapped through the loop. The truss is then formed by adjusting the reusable cable tie to reduce the diameter of the loop such that the reusable cable tie applies a force against the filamentary materials. At this point, the truss is formed. The reusable cable tie comprises a base structure, a plurality of slots, and a plurality of pegs. The plurality of slots are formed within the base structure. The plurality of pegs are attached to the base structure. The plurality of slots and the plurality of plugs vary in length and width to accommodate different filamentary material sizes.

These together with additional objects, features and advantages of the reusable cable tie will be readily apparent to those of ordinary skill in the art upon reading the following detailed description of the presently preferred, but nonetheless illustrative, embodiments when taken in conjunction with the accompanying drawings.

In this respect, before explaining the current embodiments of the reusable cable tie in detail, it is to be understood that the reusable cable tie is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the reusable cable tie.

It is therefore important that the claims be regarded as including such equivalent construction insofar as they do not depart from the spirit and scope of the reusable cable tie. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a bottom view of an embodiment of the disclosure.

FIG. 3 is a top view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
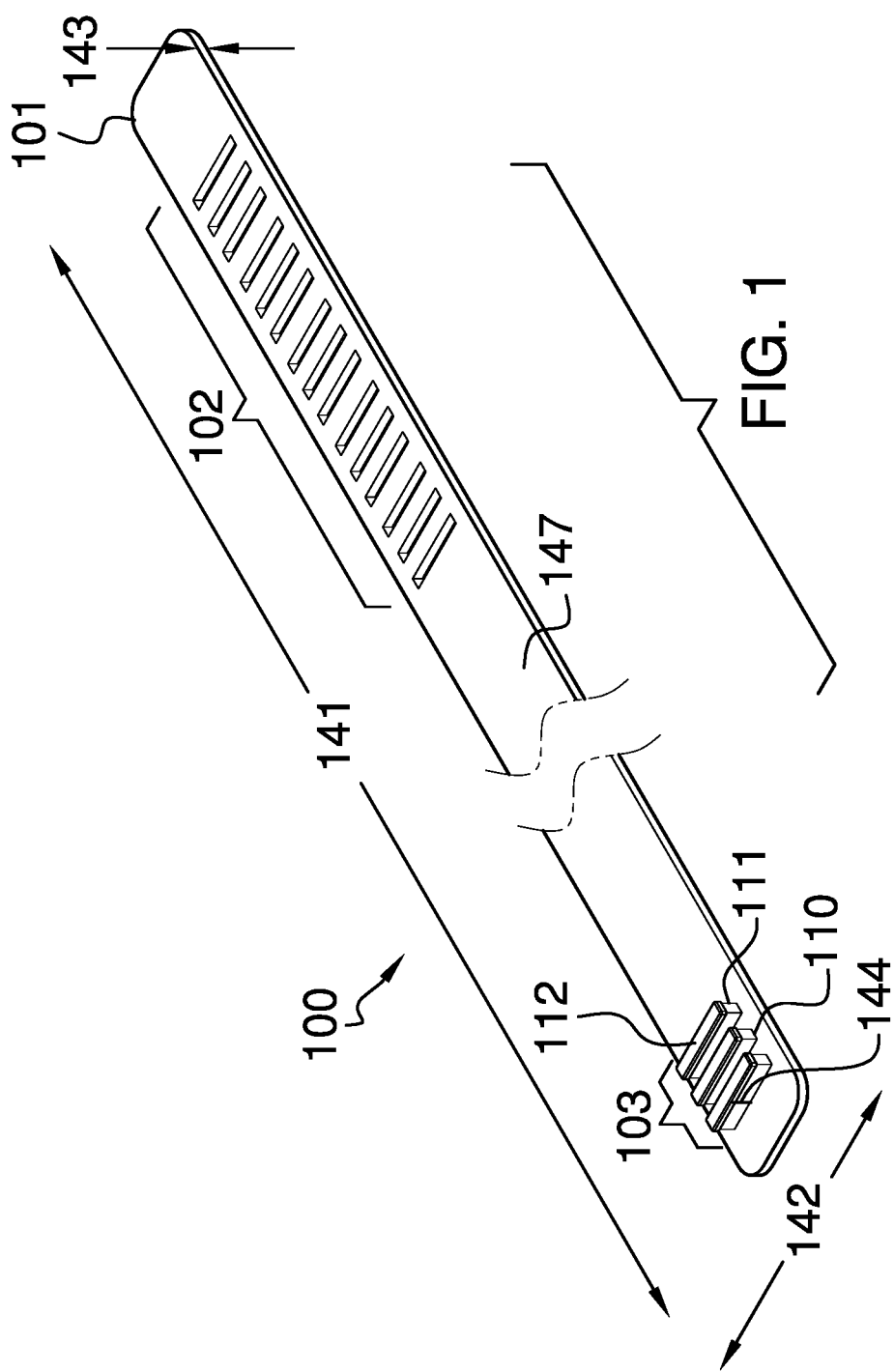
FIG. 1 is a perspective view of an embodiment of the disclosure.
Figure 4:
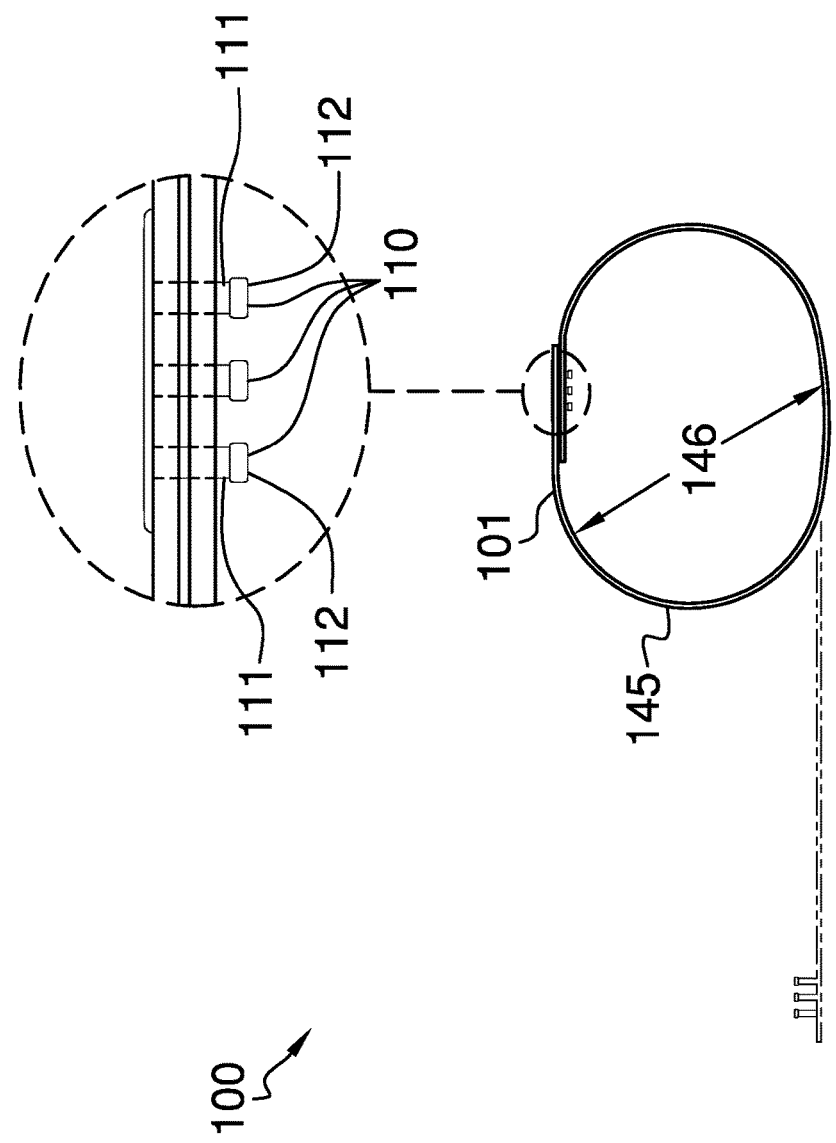
FIG. 4 is a side view of an embodiment of the disclosure.
Figure 5:
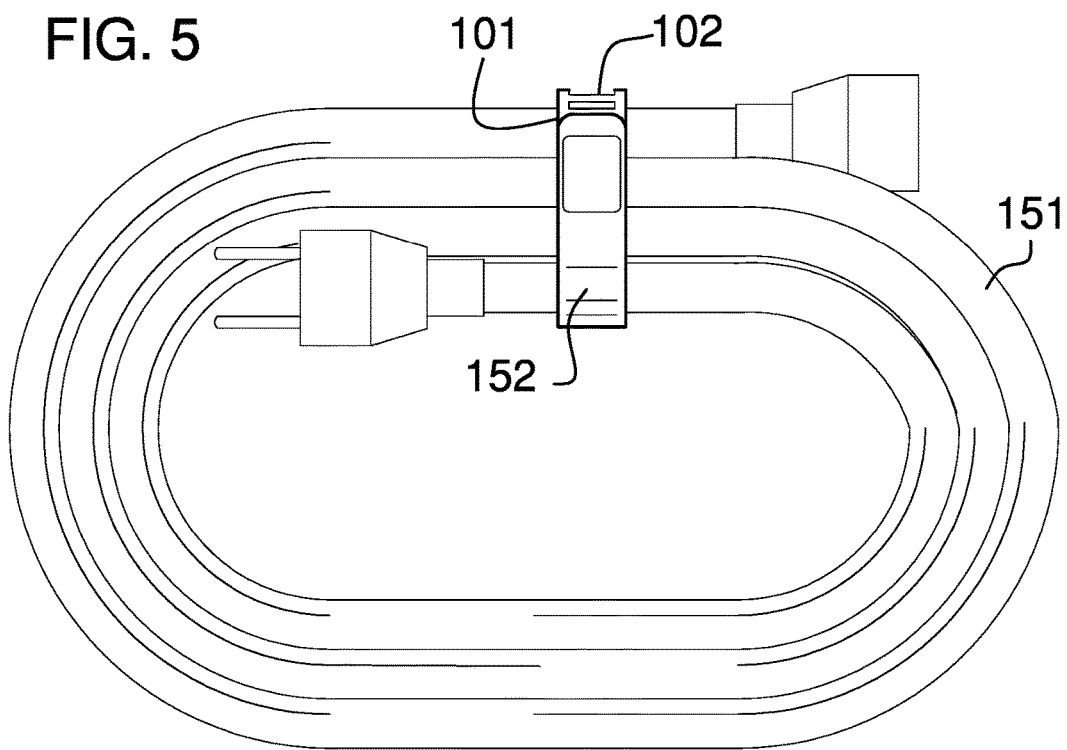
FIG. 5 is an in use view of an embodiment of the disclosure.
Figure 6:
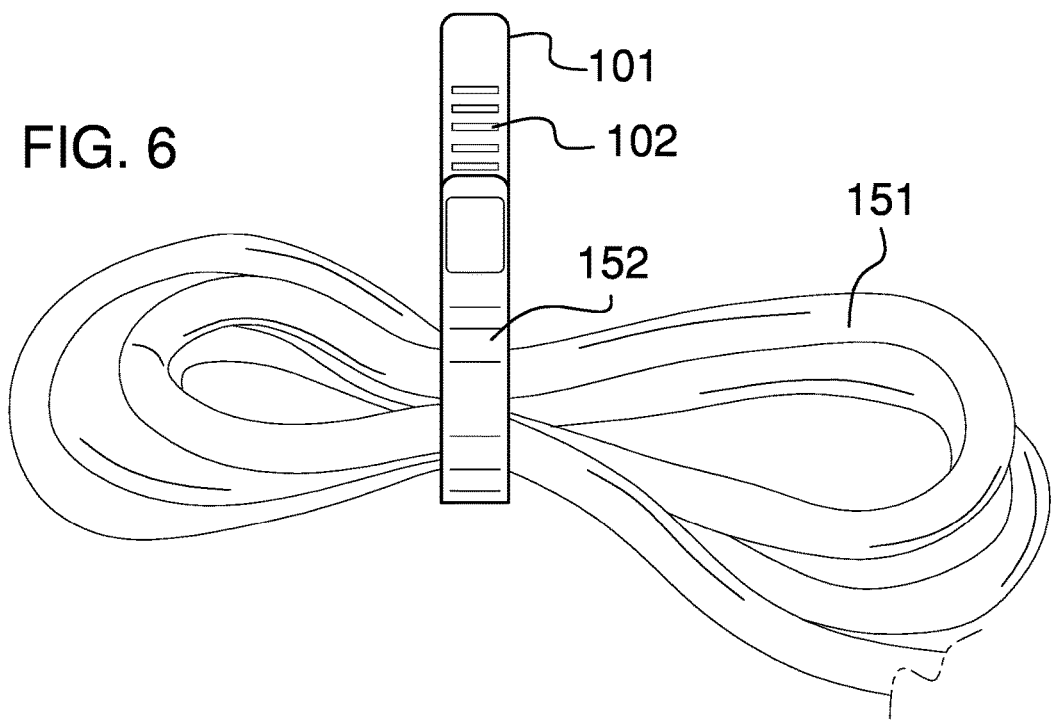
FIG. 6 is another in use view of an embodiment of the disclosure.

Detailed reference will now be made to one or more potential embodiments of the disclosure, which are illustrated in FIGS. 1 through 6.

The reusable cable tie 100 (hereinafter invention) is a self-attaching strapping apparatus. The invention 100 is used to truss filamentary materials 151 together. When in use, the invention 100 forms a loop 145 where the filamentary materials 151 are inserted before the invention 100 is tightened to form a truss 152. The reusable cable attaches to itself to form the loop 145 in a detachable manner. The diameter 146 of the loop 145 is adjustable. The filamentary materials 151 are inserted through the loop 145 or wrapped around. The truss 152 is then formed by adjusting the invention 100 to reduce the diameter 146 of the loop 145 such that the invention 100 applies a force around and against the filamentary materials 151. At this point, the truss 152 is formed. The invention 100 comprises a base structure 101, a plurality of slots 102, and a plurality of pegs 103. The plurality of slots 102 are formed within the base structure 101. The plurality of pegs 103 are attached to the base structure 101.

The base structure 101 is a rounded rectangular strip. The base structure 101 is formed as a strip from flexible metal strapping of constant thickness. The base structure 101 forms the perimeter of the loop 145 that is used to truss the filamentary material 151. The loop 145 is an enclosed ring structure that is formed by the base structure 101 when the plurality of pegs 103 are inserted through one or more slots selected from the plurality of slots 102. The loop 145 forms the truss 152 through which the filamentary materials 151 are inserted for trussing. The loop 145 is further defined with a diameter 146. The diameter 146 refers to the span of a line segment that passes through the center of the truss 152 formed by the loop 145. The span of the diameter 146 of the loop 145 is adjusted through the selection of the one or more slots selected from the plurality of slots 102.

The filamentary materials 151 refers to the externally provided objects which are bound by the truss 152. The truss 152 refers to ring shape structure formed by the base structure 101 that binds the filamentary materials 151 together. The size of the truss 152 is adjusted by adjusting the span of the diameter 146 of the loop 145.

The base structure 101 is further defined with a length direction 141, a width direction 142, and a thickness direction 143. The length direction 141 refers to the dimension of the base structure 101 with the greatest span of distance. The width direction 142 refers to the dimension of the base structure 101 that is: 1) perpendicular to the length direction 141; and, 2) combines with the length direction 141 to form the planar surface of the base structure 101 with the greatest surface area. The thickness direction 143 refers to the dimension of the base structure 101 that is perpendicular to both the length direction 141 and the width direction 142.

The base structure 101 is further defined with a primary face 147 and a secondary face 148. The primary face 147 refers to the face of the base structure 101 that is formed in the length direction 141 and the width direction 142. The secondary face 148 refers to the face of the base structure 101 that is formed in the length direction 141 and the width direction 142 that is distal from the primary face 147. The primary face 147 is the face of the base structure 101 upon which the plurality of pegs 103 are mounted.

The plurality of slots 102 comprises a plurality of rectangular block shaped negative spaces. Each slot selected from the plurality of slots 102 is identical. The negative space that forms each of the plurality of slots 102 is formed in the thickness direction 143 of the base structure 101 from and through the primary face 147 to the secondary face 148. Each slot selected from the plurality of slots 102 is formed with an inner dimension that is measured in the length direction 141 and the width direction 142. Each of the plurality of slots 102 are positioned such that the center of each of the plurality of slots 102 forms a straight line that is parallel to the length direction 141.

The center to center distance in the length direction 141 of a first set of adjacent slots selected from the plurality of slots 102 is equal to the center to center distance in the length direction 141 of any second adjacent set of adjacent slots selected from the plurality of slots 102.

Each of the plurality of pegs 103 is an individual peg 110 that projects perpendicularly away from the primary face 147 of the base structure 101. Each of the plurality of pegs 103 is identical. Each individual peg 110 is inserted into a slot selected from the plurality of slots 102 for the purpose of forming the loop 145 used for trussing the filamentary materials 151. The individual peg 110 is formed with an outer dimension in the length direction 141 and the width direction 142.

Each individual peg 110 selected from the plurality of pegs 103 is positioned on the primary face 147 of the base structure 101 such that the center of the each individual peg 110 is aligned with the centers of the individual pegs 110 remaining in the plurality of pegs 103 to form a straight line that is parallel to the length direction 141 of the base structure 101.

The center to center distance in the length direction 141 of a first set of adjacent individual pegs 110 selected from the plurality of pegs 103 is equal to the center to center distance in the length direction 141 of any second adjacent set of individual pegs 110 selected from the plurality of pegs 103. The center to center distance in the length direction 141 of any set of adjacent individual pegs 110 selected from the plurality of pegs 103 is equal to an integer (n=>1) multiple of the center to center distance in the length direction 141 of any set of adjacent slots selected from the plurality of slots 102.

The line formed by each of the centers of the plurality of pegs 103 is aligned in the width direction 142 with the line formed by the centers of each of the plurality of slots 102. By aligned in the width direction 142 is meant that a separation between the lines may exist in the thickness direction 143 but that the lines will project onto each other in a plane formed by the length direction 141 and the width direction 142.

Each individual peg 110 comprises a plate 111 and a headpiece 112. The plate 111 is further defined with a plate height 144.

The plate 111 is a rectangular block structure that projects perpendicularly away from the primary face 147 of the base structure 101. The outer dimensions of the plate 111 are lesser than the inner dimensions of any slot selected from the plurality of slots 102 such that the plate 111 may be inserted into the selected slot. The plate 111 attaches to the primary face 147 of the base structure 101 in the manner of a cantilever. The free end of the plate 111 is the distal from the edge attaching the plate 111 to the base structure 101.

The plate height 144 is the span of the distance from the primary face 147 to the free end of the plate 111 as measured in the thickness direction 143. The plate height 144 of the plate 111 is greater than the span of the base structure 101 in the thickness direction 143 such that the center of each headpiece 112 may be fully inserted through any slot selected from the plurality of slots 102.

The headpiece 112 is an elastic structure that is attached to the free end of the plate 111. The headpiece 112 is roughly formed in the shape of a rectangular block. The outer dimensions of the headpiece 112 are greater than the inner dimension of any slot selected from the plurality of slots 102. This oversizing of the headpiece 112 requires the deformation of the headpiece 112 in order to insert the headpiece 112 through a slot selected from the plurality of slots 102. Once the headpiece 112 is inserted through the selected slot, the headpiece 112 returns to its relaxed shape which secures the individual peg 110 within the selected slot until the headpiece 112 is later deformed such that the headpiece 112 can be removed from the selected slot.

To use the invention 100, the plurality of pegs 103 are inserted into one or more slots selected from the plurality of slots 102 to form the loop 145. The loop 145 is formed such that the secondary face 148 forms the exterior surface of the loop 145 while the primary face 147 forms the interior surface of the loop 145.

The following definitions were used in this disclosure:

Align: As used in this disclosure, align refers to an arrangement of objects that are: 1) arranged in a straight plane or line; or, 2) arranged to give a directional sense of a plurality of parallel planes or lines.

Cable Tie: As used in this disclosure, a cable tie is a type of fastener that is used to tie two objects together. The cable tie has a box end and an open end. The box end further comprises a gear like structure wherein when the open end is inserted into the gear like structure, the gear like structure acts as a ratchet that prevents the open end from being removed from the gear like structure.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Diameter: As used in this disclosure, a diameter of an object is a straight line segment that passes through the center of an object. The line segment of the diameter is terminated at the perimeter or boundary of the object through which the line segment of the diameter runs.

Disposable: As used in this disclosure, disposable is an adjective that refers to an object that is designed and intended for a single use. Within this context, an object would be considered disposable if it is not reusable after its initial use.

Elastic: As used in this disclosure, an elastic is a material or object that deforms when a force is applied to it and that is able to return to its relaxed shape after the force is removed. A material that exhibits these qualities is also referred to as an elastomeric material.

Inner Dimension: As used in this disclosure, the term inner dimension describes the span from a first inside or interior surface of a container to a second inside or interior surface of a container. The term is used in much the same way that a plumber would refer to the inner diameter of a pipe.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal. When made of wood, a plate is often referred to as a board.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Rectangular Block: As used in this disclosure, a rectangular block refers to a three dimensional structure comprising six rectangular surfaces formed at right angles. Within this disclosure, a rectangular block may further comprises rounded edges and corners.

Relaxed Shape: As used in this disclosure, a structure is considered to be in its relaxed state when no shear, strain, or torsional forces are being applied to the structure.

Rounded: A used in this disclosure, the term rounded refers to the replacement of an apex or vertex of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Strap: As used in this disclosure a strap is a strip of a flexible material that is used to fasten, secure, carry, or hold onto something.

Strip: As used in this disclosure, the term describes a long and narrow object of uniform thickness that appears thin relative to the length of the object. Strips are often rectangular in shape.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Truss: As used in this disclosure, the term truss means to gather or secure in a bundle a filamentary materials. By filamentary materials is meant materials that can be considered to be roughly cylindrical or prism shapes at the point where the filamentary materials are secured. Examples of filamentary materials would include, pipes, sticks, and cables. When used as a noun, the term truss refers to the bundle of filamentary materials.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A flexible strap comprising:
   wherein the flexible strap comprises a base structure, a plurality of slots, and a plurality of pegs;
   wherein the plurality of slots are formed within the base structure;
   wherein the plurality of pegs are attached to the base structure;
   wherein the flexible strap is a self-attaching strapping apparatus;
   wherein the flexible strap trusses filamentary materials together;
   wherein the flexible strap forms a loop through which the filamentary materials are inserted before the flexible strap is tightened to form a truss;
   wherein the reusable cable attaches to itself to form a loop in a detachable manner;
   wherein the loop is further defined with a diameter and a perimeter;
   wherein the diameter of the loop is adjustable;
   wherein the filamentary materials are inserted through the loop;
   wherein the truss is formed by adjusting the flexible strap to reduce the diameter of the loop such that the flexible strap applies a force against the filamentary materials;
   wherein the base structure is a rounded rectangular strip;
   wherein the base structure is formed as a strip from flexible metal strapping of constant thickness;
   wherein the base structure forms the perimeter of the loop trusses the filamentary material;
   wherein the loop is an enclosed ring structure that is formed by the base structure when the plurality of pegs are inserted through one or more slots selected from the plurality of slots;
   wherein the loop forms the truss;
   wherein the span of the diameter of the loop is adjusted through the selection of the one or more slots selected from the plurality of slots;
   wherein the size of the truss is adjusted by adjusting the span of the diameter of the loop;
   wherein the base structure is further defined with a length direction, a width direction, and a thickness direction;
   wherein the length direction refers to the dimension of the base structure with the greatest span of distance;
   wherein the width direction refers to the dimension of the base structure that is perpendicular to the length direction;
   wherein the width direction combines with the length direction to form the planar surface of the base structure with the greatest surface area;
   wherein the thickness direction refers to the dimension of the base structure that is perpendicular to both the length direction and the width direction;
   wherein the base structure is further defined with a primary face and a secondary face;
   wherein the primary face refers to the face of the base structure that is formed in the length direction and the width direction;
   wherein the secondary face refers to the face of the base structure that is formed in the length direction and the width direction that is distal from the primary face;
   wherein the primary face is the face of the base structure upon which the plurality of pegs are mounted;
   wherein the plurality of slots comprises a plurality of rectangular block shaped negative spaces;
   wherein each slot selected from the plurality of slots is identical;
   wherein the negative space that forms each of the plurality of slots is formed in the thickness direction of the base structure from and through the primary face to the secondary face;
   wherein each slot selected from the plurality of slots is formed with an inner dimension that is measured in the length direction and the width direction;
   wherein each of the plurality of slots are positioned such that the center of each of the plurality of slots forms a straight line that is parallel to the length direction;
   wherein the center to center distance in the length direction of a first set of adjacent slots selected from the plurality of slots is equal to the center to center distance in the length direction of any second set of adjacent slots selected from the plurality of slots;
   wherein each of the plurality of pegs is an individual peg that projects perpendicularly away from the primary face of the base structure;
   wherein each of the plurality of pegs is identical;
   wherein the individual peg is formed with an outer dimension in the length direction and the width direction;
   wherein each individual peg is inserted into a slot selected from the plurality of slots for the purpose of forming the loop;

wherein each individual peg selected from the plurality of pegs is positioned on the primary face of the base structure such that the center of each individual peg is aligned with the centers of the individual pegs remaining in the plurality of pegs to form a straight line that is parallel to the length direction of the base structure;

wherein the center to center distance in the length direction of a first set of adjacent individual pegs selected from the plurality of pegs is equal to the center to center distance in the length direction of any second adjacent set of individual pegs selected from the plurality of pegs;

wherein the center to center distance in the length direction of any set of adjacent individual pegs selected from the plurality of pegs is equal to an integer multiple of the center to center distance in the length direction of any set of adjacent slots selected from the plurality of slots;

wherein the integer multiple is a positive integer that is greater than or equal to one;

wherein the line formed by each of the centers of the plurality of pegs is aligned in the width direction with the line formed by the centers of each of the plurality of slots;

wherein each individual peg comprises a plate and a headpiece;

wherein the headpiece attaches to the plate;

wherein the plate is further defined with a plate height;

wherein the plate is a rectangular block structure that projects perpendicularly away from the primary face of the base structure;

wherein the plate attaches to the primary face of the base structure in the manner of a cantilever;

wherein the plate is further defined with a free end;

wherein the plate height is the span of the distance from the primary face to the free end of the plate as measured in the thickness direction.

2. The flexible strap according to claim 1 wherein the outer dimensions of the plate are lesser than the inner dimensions of any slot selected from the plurality of slots such that the plate may be inserted into the selected slot.

3. The flexible strap according to claim 2
wherein the headpiece is an elastic structure that is attached to the free end of the plate;

wherein the headpiece is formed in the shape of a rectangular block;

wherein the plate height of the plate is greater than the span of the base structure in the thickness direction such that the headpiece may be fully inserted through any slot selected from the plurality of slots.

4. The flexible strap according to claim 3
wherein the outer dimensions of the headpiece are greater than the inner dimension of any slot selected from the plurality of slots;

wherein the insertion of the headpiece through a slot selected from plurality of slots requires the deformation of the headpiece.

5. The flexible strap according to claim 4 wherein the loop is formed such that the secondary face forms the exterior surface of the loop while the primary face forms the interior surface of the loop.

\* \* \* \* \*